Figure 1:
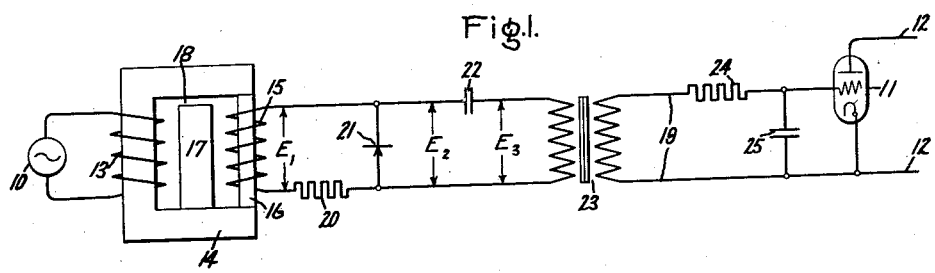

May 22, 1934.   B. D. BEDFORD   1,960,047
ELECTRIC VALVE CIRCUITS
Original Filed May 27, 1932

Inventor:
Burnice D. Bedford,
by Charles E. Mullan
His Attorney.

Patented May 22, 1934

1,960,047

UNITED STATES PATENT OFFICE 1,960,047

ELECTRIC VALVE CIRCUITS

Burnice D. Bedford, Schenectady, N. Y., assignor to General Electric Company, a corporation of New York Application May 27, 1932, Serial No. 614,135
Renewed October 10, 1933

4 Claims. (Cl. 175—363)

My invention relates to electric valve circuits and more particularly to excitation circuits for valves of the vapor electric discharge type.

In the use of valves of the vapor electric discharge type in electric translating circuits it is desirable to have an excitation circuit which will provide a periodic grid potential, the positive portions of the cycle of which have a substantially perpendicular wave front. In case a valve is used in a polyphase circuit, it is further desirable that the duration of the positive portions of the cycle shall be less than 180 electrical degrees, that is, less than one-half wave, and in general, less than $1/n$th of a cycle where $n$ is the number of phases. In addition, it is desirable that the grid potential shall have a substantially constant negative value during the remaining portion of each cycle. Heretofore, this type of excitation has not been obtainable without the use of more or less complicated grid circuits including negative biasing batteries or other biasing means.

It is an object of my invention to provide an improved excitation circuit for a valve of the vapor electric discharge type, which will have the above-mentioned desirable characteristics and which will be simple and reliable in operation.

It is another object of my invention to provide an improved excitation circuit for a valve of the vapor electric discharge type which will provide a source of periodic grid potential having substantially perpendicular positive wave front, and in which the positive portions of the wave may be limited to any desired fraction of a cycle.

It is a further object of my invention to provide an improved excitation circuit for a valve of the vapor electric discharge type which will provide a periodic grid potential, the positive and negative portions of which are substantially rectangular in wave form and of any desired relative duration.

In accordance with the preferred embodiment of my invention an alternating potential of substantially sinusoidal wave form is first converted into one of substantially rectangular wave form, both the positive and negative rectangular portions being of a duration substantially less than 180 electrical degrees. This conversion is effected in a well known manner by means of a self-saturating transformer, the magnetic circuit of which is provided with a magnetic shunt including an air gap. The grid circuit of the electric valve is energized from this transformer, but the negative half cycles are by-passed from the grid circuit through a unilaterally conductive device, such for example as a contact rectifier. A series condenser is also interposed between the grid circuit and the saturating transformer to suppress any unidirectional component of current. In some cases it may be desirable to interpose an insulation transformer between the grid circuit and the saturating transformer and in such case the series capacitor serves to prevent direct current saturation of the grid transformer. The arrangement wherein the negative half cycles are by-passed from the grid circuit through a unilaterally conductive device is disclosed and broadly claimed in my copending application, Serial No. 614,134, filed May 27, 1932, for Electric valve circuits, which is assigned to the same assignee as the present application.

For a better understanding of my invention, together with other and further objects thereof, reference is had to the following description taken in connection with the accompanying drawing, and its scope will be pointed out in the appended claims. Fig. 1 of the drawing illustrates the preferred form of my invention for producing a periodic grid potential having the above described characteristics, while Figs. 2, 3, and 4 illustrate certain electrical characteristics of the excitation circuit of Fig. 1.

Referring now to Fig. 1 of the drawing, there is illustrated an arrangement for deriving from a source of alternating potential 10 of substantially sinusoidal wave form, a periodic grid potential having the desired characteristics suitable for exciting the grid of a vapor electric discharge valve 11 included in an electric translating circuit 12. The valve 11 is diagrammatically illustrated as of the conventional type comprising an anode, a cathode, and a control grid, enclosed in an envelope containing an ionizable gas or vapor. It is well understood that in this type of valve the time of starting of the current between the cathode and anode is determined by the potential upon the control grid, but that the current through the valve can be interrupted only by means of the external circuit. The foregoing arrangement includes a self-saturating transformer comprising a primary winding 13, a magnetic core member 14, and a secondary winding 15 mounted on a self-saturating leg 16 of the magnetic core member 14. The core member 14 is also provided with a non-saturating magnetic shunt 17 having an air gap 18. The grid circuit 19 of the electric valve 11 is energized from the secondary winding 15 through a current limiting resistor 20, but the negative half cycles of the secondary winding 15 are by-passed from the grid circuit through a unilaterally conductive device illustrated as a contact rectifier 21. A capacitor 22 interposed between the grid circuit 19 and the secondary winding 15 of the self-saturating transformer serves to suppress the flow of any unidirectional component resulting from the by-passing of the negative half cycles through the rectifier 21. In some cases it may be desirable also to include an insulation transformer 23 between the winding 15 and the grid circuit 19. In such a case the capacitor 22 serves to prevent a direct current saturation of the grid transformer 23. The grid of the electric valve 11 is interconnected with its cathode through the grid transformer 23 and a current limiting resistor 24. If desired, a capacitor 25 may be connected between the grid and cathode of the valve to minimize the effect of transients in the grid or anode circuit of the valve 11 upon the control of the valve.

Figure 2:
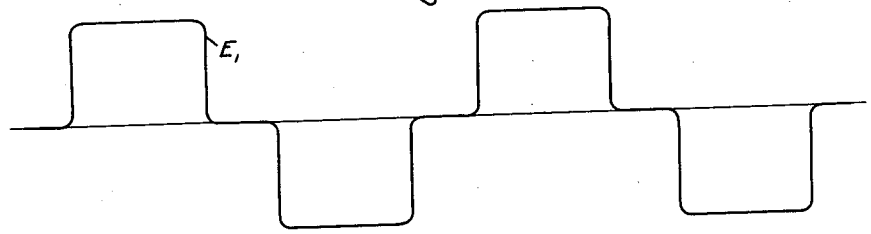
Figure 3:
Figure 4:
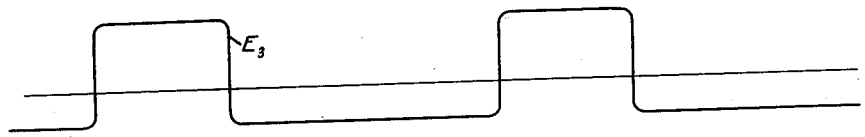

The operation of the above described apparatus will be better understood by reference to Figs. 2, 3 and 4 of the drawing. In Fig. 2 the curve $E_1$ represents the potential of the secondary winding 15 of the self-saturating transformer. The contact rectifier 21 suppresses the negative half cycles from the grid circuit resulting in a potential having the wave form of the curve $E_2$ of Fig. 3 of the drawing. It is seen that the curve $E_2$ has a unidirectional component, that is, an average unidirectional potential. This unidirectional component may be suppressed from the grid circuit by means of a series capacitor 22 with the result that the wave form of the grid potential is illustrated by the curve $E_3$ of Fig. 4 of the drawing. This periodic potential is impressed directly upon the grid of the valve 11 through the insulation transformer 23.

It will be noted that the curve $E_3$ has all of the desirable characteristics noted above, that is, the positive portion of the wave has a substantially perpendicular wave front and a duration substantially less than 180 electrical degrees. During the remaining portion of the cycle, however, the grid potential has substantially constant negative value which eliminates the necessity of grid bias batteries or other grid biasing means. On the other hand, the wave form of Fig. 4 is a pure alternating wave form having no unidirectional component; that is, the area of the positive and negative portions are equal. The duration of the positive portions of this wave may be limited to any predetermined value by proper proportioning of the self-saturating transformer, that is, the air gap 18 and the cross section of the saturating leg 16. However, it is seen that if the positive portion of the wave is shortened the average negative potential during the remainder of the cycle must be correspondingly diminished in order to keep the areas of the positive and negative portions of the wave equal in value. Therefore it is desirable to have the duration of the positive periods as long as consistent with the satisfactory operation of the particular translating circuit in which the valve 11 is included.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In an electric translating circuit, the combination of a vapor electric valve provided with an anode, a cathode, and a control grid, a source of alternating potential of substantially sinusoidal wave form, electromagnetic means for converting said sinusoidal potential into one of rectangular wave form, each half wave comprising a rectangular portion of a duration less than 180 electrical degrees and a portion of substantially zero potential, a grid circuit for said valve energized from said electromagnetic means, means for by-passing the negative half cycles from said grid circuit, and means for suppressing the unidirectional component of said rectangular potential from said grid circuit.

2. In an electric translating circuit, the combination of a vapor electric valve provided with an anode, a cathode, and a control grid, a source of alternating potential of substantially sinusoidal wave form, a self-saturating transformer energized from said source and acting to convert said sinusoidal potential into one of a wave form comprising a series of substantially separated rectangular portions alternately of opposite polarity, a grid circuit for said valve energized from said transformer, means for by-passing the negative portions of the output of said transformer from said grid circuit, and means for suppressing the unidirectional component of said rectangular potential from said grid circuit.

3. In an electric translating circuit, the combination of a vapor electric valve provided with an anode, a cathode, and a control grid, a source of alternating potential of substantially sinusoidal wave form, electromagnetic means for converting said sinusoidal potential into one of a wave form comprising a series of substantially separated rectangular portions alternately of opposite polarity, a grid circuit for said valve energized from said electromagnetic means, a rectifying device connected in parallel to said grid circuit to by-pass the negative portions of said rectangular wave, and means for suppressing the unidirectional component of said rectangular potential from said grid circuit.

4. In an electric translating circuit, the combination of a vapor electric valve provided with an anode, a cathode, and a control grid, a source of alternating potential of substantially sinusoidal wave form, a self-saturating transformer energized from said source and acting to convert said sinusoidal potential into one of a wave form comprising a series of substantially separated rectangular portions alternately of opposite polarity, a grid circuit for said valve energized from said transformer, a rectifying device connected to by-pass the negative portions of the output of said transformer from said grid circuit, a grid transformer interposed in the connections to said grid, and a capacitor connected in the input circuit of said grid transformer to suppress the flow of unidirectional current therein.

BURNICE D. BEDFORD.